June 11, 1968     S. LEVITT     3,387,730
CONTAINER LIFTING FRAME WITH MEANS TO SHIFT
SAME LATERALLY ON A FORKLIFT TRUCK
Filed Dec. 23, 1966     3 Sheets-Sheet 1

INVENTOR.
SEMOND LEVITT

BY *Max R. Millman*
ATTORNEY.

June 11, 1968 S. LEVITT 3,387,730
CONTAINER LIFTING FRAME WITH MEANS TO SHIFT
SAME LATERALLY ON A FORKLIFT TRUCK
Filed Dec. 23, 1966 3 Sheets-Sheet 2
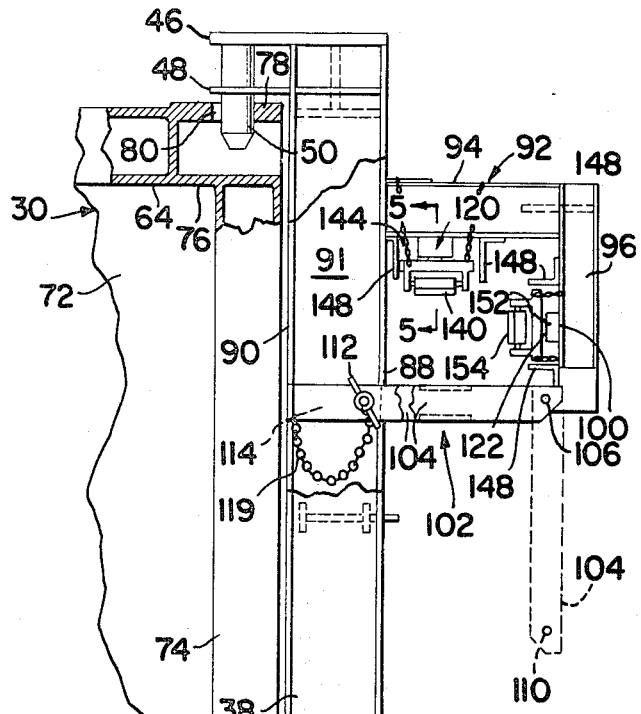
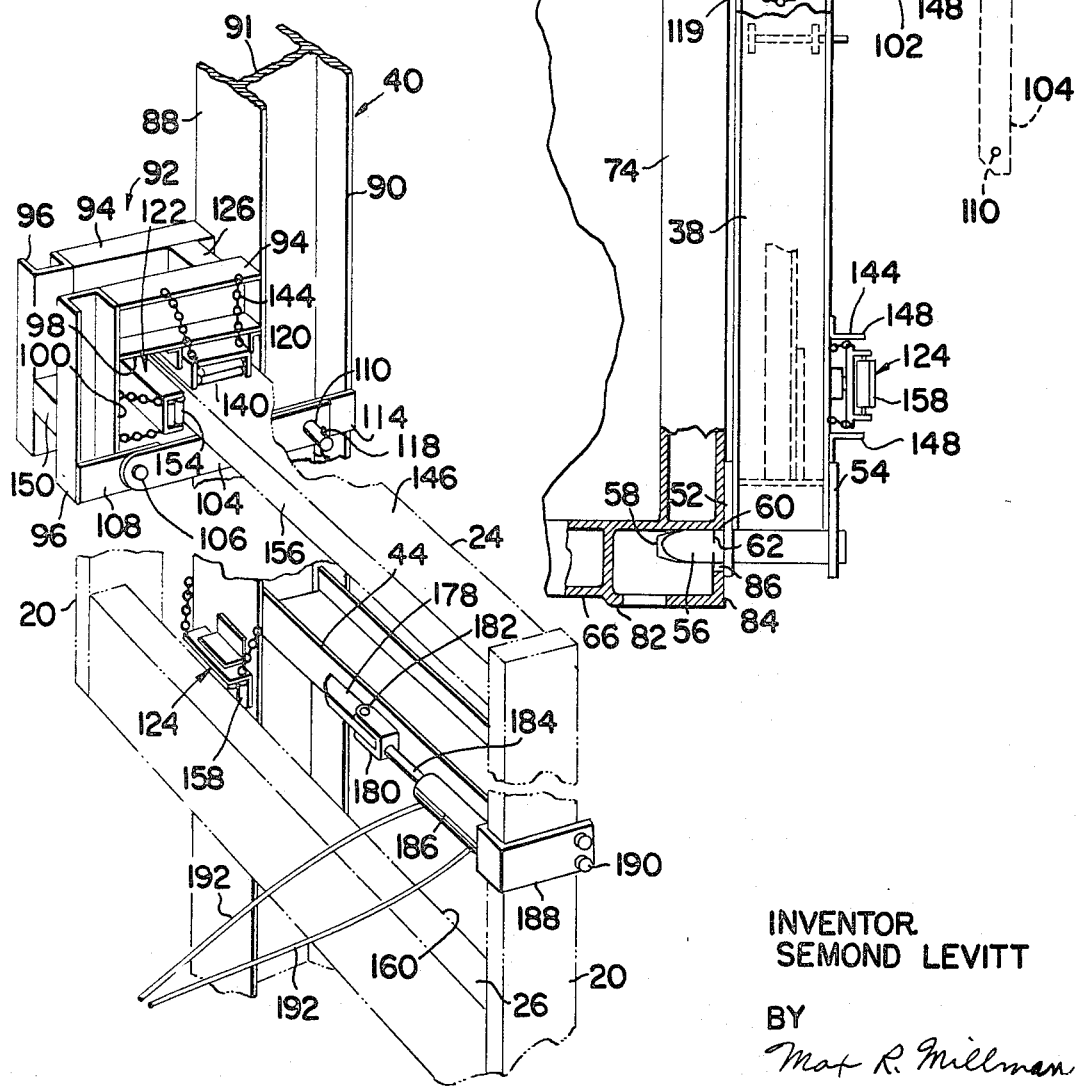
INVENTOR.
SEMOND LEVITT
BY
Mat R. Millman
ATTORNEY.

INVENTOR.
SEMOND LEVITT
BY
Max R. Millman
ATTORNEY.

United States Patent Office

3,387,730
Patented June 11, 1968

3,387,730
CONTAINER LIFTING FRAME WITH MEANS TO SHIFT SAME LATERALLY ON A FORK-LIFT TRUCK
Semond Levitt, Huntingdon Valley, Pa., assignor to Strick Corporation, Fairless Hills, Pa., a corporation of Pennsylvania
Filed Dec. 23, 1966, Ser. No. 604,243
8 Claims. (Cl. 214—621)

A means to lift and transport substantially rectangular containers, such as van size cargo bodies, comprised of a frame substantially coextensive with the container having lower horizontal pins adapted to enter corner members at the bottom of the container and upper vertical pins adapted to enter corner members at the top of the container and means mounting the frame on a lift truck with power operated means to shift the frame laterally relative to the lift truck.

This invention relates to means for handling van size cargo containers and constitutes an improvement over copending application Ser. No. 567,699, filed July 25, 1966, both the aforementioned and the instant applications having a common assignee.

The modern trend in freight haulage is known in the art as containerization and comprises the use of a van size cargo container, such as a trailer body, as the shipping container for intermodal transfer to highway, ship, rail or air transport, thus effecting savings in time and labor normally required for loading and unloading the cargo at intermodal transfers. A standard 20′ trailer body fully laden with cargo carries about 44,800 pounds. Thus, the facilities, such as cranes and equivalent devices, for moving the laden containers in a loading area and for stacking them for storage or in preparation for shipment, as well as for effecting the intermodal transfers, are necessarily heavy, expensive and present difficulties in maneuverability.

The primary object of this invention is to provide a means for handling cargo van containers which can be mounted on forklift trucks in place of the forks, thus obviating the need for heavy and expensive facilities, such as cranes and equivalent devices, having means to shift the frame laterally relative to the truck to permit the center of effort of the truck to be more closely aligned with the center of gravity of an unbalanced load in the container and/or to more quickly position the lifting frame on the container or the container on its support.

Another object of the invention is to provide a lifting frame of the character described in which the means to shift it laterally relative to the lift truck includes antifriction bearing members mounted for universal pivotal movement on the lift truck and engaging the lift truck subframe to effect the lateral movement of the lifting frame with a minimum of effort as well as to provide uniform distribution of the load on the bearings.

Another object of the invention is to provide a lifting frame of the character described in which the means to shift it laterally relative to the lift truck includes bearings comprised of roller assemblies interposed between the lifting frame and the lift truck subframe so that the motive means to effect the shifting movement has only to overcome rolling friction while the lifting frame is supporting a fully loaded container.

Another object of the invention is to provide a lifting frame of the character described which can be mounted upon the lift truck with relative ease and can be readily shifted laterally thereon by hydraulic motive means operably by the lift truck operator from the cab thereof.

These and other objects of the invention will become more apparent as the following description proceeds in conjunction with the accompanying drawings, wherein:

FIG. 3 is a side elevational view of the lifting frame per se with parts broken away to disclose further details of the frame, and shown engaging the corner members of a container partially in section;

FIG. 4 is a fragmentary perspective view looking at the rear of the lifting frame shown mounted on the lift truck subframe and including the motive means to shift the same;

Specific reference is now made to the drawings in which similar reference characters are used for corresponding elements throughout.

Figure 1:
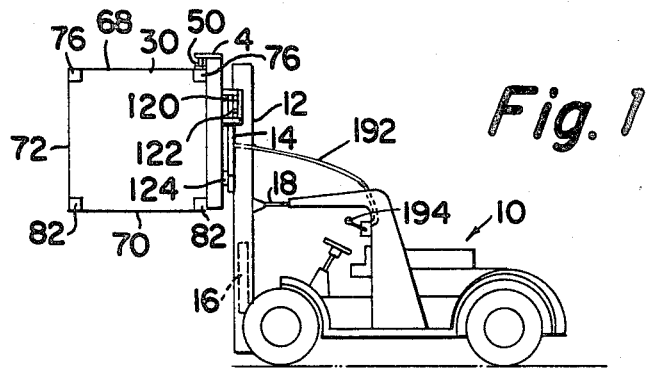
FIG. 1 is a diagrammatic view of the invention shown mounted on a lift truck and in the operation of lifting a container.

Indicated generally at 10 is a conventional heavy duty forklift truck, such for example as the Hyster Challenger 460, made by the Hyster Company of Danville, Ill. At its front end the truck mounts a vertically extending boom or upright 12 preferably in the form of interconnected vertical channels in which is movably mounted a load carriage or subframe 14 which normally carries forks or load arms (not shown). A hydraulic means shown diagrammatically at 16 operatively acts upon the carriage 14 to raise and lower the same while another hydraulic means shown diagrammatically at 18 acts to tilt the upper end of the boom 12 about a vertical axis perpendicular to the ground. The subframe 14 is generally rectangular and includes spaced vertical side members 20 and 22 which are interconnected by spaced horizontal upper and lower bars 24 and 26.

A frame 28 is provided which is preferably as long and as high as the container 30 which, if it is a van size container, is about 20′ long, about 8′ high and about 8′ wide, and when laden with cargo can attain a gross weight of about 44,800 lbs. The frame includes upper and lower horizontal members 32 and 34 which are interconnected at their ends by vertical members 36 and 38 and intermediate their ends by further substantially parallel vertical members 40 and 42, there being a member 44 extending horizontally between the members 40 and 42. Diagonal flanged braces 46 and 48 interconnect the upper ends of the intermediate vertical members 40 and 42 with the lower ends of the end vertical members 36 and 38. Assuming the frame is designed to lift a 20′ container, the distance between the end vertical members 36 and 38 will be about 20′, between the intermediate vertical members 40 and 42 will be about 9′ (which may vary depending on the forklift truck used), and between the upper and lower horizontal members 32 and 34 about 8′. The members 32, 34, 36, 38, 40, 42 and 44 are preferably of I cross-section.

The means on the lifting frame 28 to engage the container is shown more particularly in FIG. 3. Secured to the top of each end vertical member 36 and 38 is a pair of vertically spaced forwardly extending plates 46 and 48 which in turn secure a vertically extending pin 50 preferably of substantially rectangular cross-section and including a tapered tip. Secured to the lower end of each vertical member 36 and 38 below the lower horizontal member 34 is a pair of plates 52 and 54 which in turn secure a horizontal pin 56. The pin is generally rectangular in cross-section for the major portion of its length and includes a smoothly tapered tip 58. The contour of the pin is such that the upper surface of its rear portion 60 is reduced somewhat so that it contains a shoulder 62 just to the rear of the tapered tip.

The container 30, which is generally rectangular and enclosed, preferably comprises top and bottom rails 64 and 66 mounting a roof 68 and a floor member 70 and side walls 72 desirably of stressed skin construction, and hollow vertically extending corner posts 74. At its top, each corner post secures a hollow corner member 76, which is also secured to the top rail 64, which corner member, preferably a steel casting, includes a horizontal wall 78 with an opening 80 therethrough which approximates the cross-sectional shape but is somewhat larger in area than that of the upper vertical pin 50. At its lower end, each corner post secures a hollow corner member, preferably a steel casting, 82 which is also secured to the bottom rail 66, which corner member includes a vertical wall 84 with an opening 86 therethrough which approximates the cross-sectional shape but is somewhat larger in area than that of the lower horizontal pin 56.

The means to detachably mount the lifting fram 28 on the subframe or carriage 14 of the lift truck 10, after the forks have been removed, is shown in greater detail in FIGS. 3 and 4 and is associated with each of the intermediate vertical members 40 and 42. Since the means on each member is identical, a single description will suffice.

It will be noted that each member 40 or 42 is preferably of I-beam construction and hence it contains rear and front substantially flat flanges or faces 88 and 90 connected by a web 91. Affixed to the rear face 88 is a downwardly opening substantially L-shaped member 92 which is comprised of a pair of spaced inter-connected brackets each having a horizontal rearwardly extending arm 94 and a downwardly extending arm 96, preferably of channel construction. The arms 94 have lower or inner faces 98 which lie substantially in the same horizontal plane and the arms 96 have inner faces 100 which lie substantially in the same vertical plane. The members 92 hook over the upper horizontal member 24 of the subframe 14 of the lift truck, the lower open end of each member being closed by a latch or gate member 102 which unit is comprised of interconnected arms 104 which are pivoted at their rear ends around a horizontal pin 106 that passes through forwardly extending ears 108 which are secured to the lower ends of the vertical members 96. When raised, the arms 104 underlie the upper horizontal lift frame member 24 to limit the upward movement of the lifting frame 28 relative to the lift truck subframe 14. The arms 104 are retained in the horizontal position by means of a rod 110 with a cross head 112 at one of its ends, the rod extending removably through horizontally aligned apertures in bars 114 secured to each frame member 40 and 42 and through apertures 116 in the ends of the bars 104 there to be retained by a suitable cotter pin 118, the rod 110 being mounted on the frame by means of a suitable chain 119.

Each of the mounting members 92 is provided with an upper bearing member 120 and a side bearing member 122. At a predetermined location beneath each mounting member 92, the rear face 88 of each member 40 and 42 secures a side bearing member 124. As all three bearing members are alike, a single description will suffice in connection with FIG. 5 which shows the upper bearing members 120.

Adjacent their front ends, the horizontal arms 94 are interconnected by a bar 126 whose lower end is provided with a bottom opening spherical recess 128 forming a female member. A housing is provided having spaced side plates 130 and 132 connected at its top by a web 134 having an upstanding projection or male member 136 with a spherical head which fits into the recess 128 to form a universal joint. The web 134 is positioned adjacent the lower surface 98 of the members 94. Further, rods 138 interconnect the plates 130 and 132 for rigidity and between the plates is mounted a conventional roller assembly comprised of an endless chain of rollers 140 movable around a core 142 which is affixed between the plates 130 and 132. The bearing assembly is flexibly mounted to permit its universal movement by means of chains 144 which are terminally secured to the members 94 and the tops of the side plates 130 and 132.

The location of the bearing assembly 120 is such that the rollers 140 will ride upon the upper surface 146, see FIG. 4, of the upper horizontal member 24 of the lift truck subframe thereby taking the traveling load. To assure that the rollers are pointed in the right direction there are flanged members 148 secured to members 94 that extend on one or both sides of the side plates 130 and 132 to limit horizontal pivotal movement of the upper bearing assembly 120.

The other bearing member 122 associated with the mounting member 92 is identical in structure as member 120 except that the bar 150 which is equivalent to member 126 interconnects the vertical members 96 so that the web of the bearing is positioned adjacent the inner faces 100 of the members 96 and the universal joint, i.e., male and female members 128 and 136 extend in a generally horizontal position as shown diagrammatically at 152. The chains 144 flexibly suspend the bearing assembly from the vertical members 96 and the members 148 at the sides thereof limit the movement of the bearing in a vertical plane. Thus the rollers of this bearing, shown diagrammatically at 154 in FIGS. 3 and 4, bear against the rear face 156 of the upper horizontal member 24 of the lift truck subframe 14.

The bearing member 124 is universally and flexibly mounted on the rear face 88 of each frame member 40 and 42 so that its rollers, shown diagrammatically at 158 in FIGS. 3 and 4, bear against the front face 160 of the lower horizontal member 26 of the lift truck subframe 14. The side members 148 serve to restrain movement of the bearing member in a vertical plane. Thus the bearing member 124 is disposed in the same manner as member 122 except that its rollers face rearwardly instead of forwardly. The bearing members 122 and 124 act to take moment load.

Figure 6:
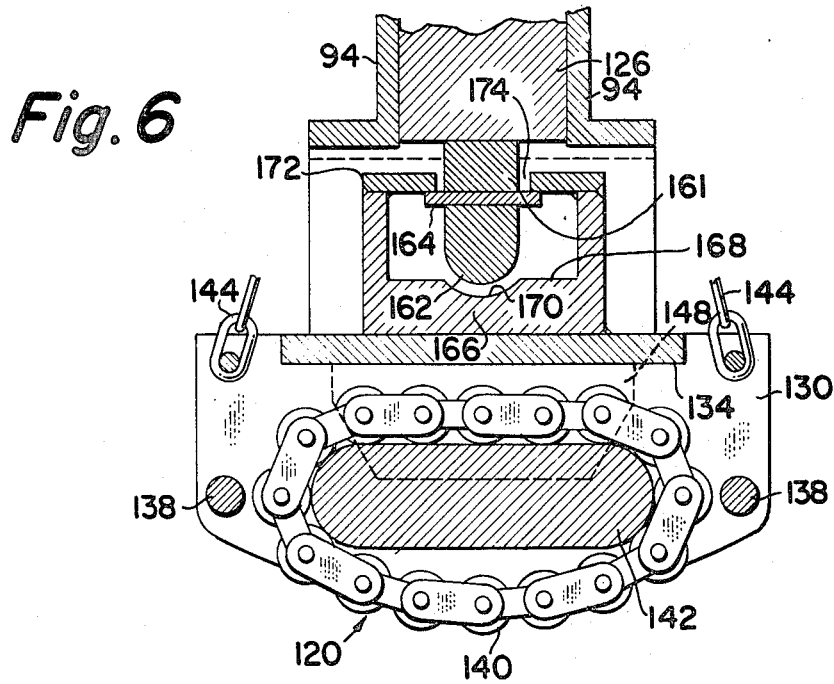
FIG. 6 is a view similar to FIG. 5 of a modified form of the bearing member.

Several modified forms of bearing members are possible. Thus as seen in FIG. 6, the vertically extending bar 126 joining the members 94 for the top bearing 120 (or extending horizontally from the member 50 for the bearing 122 or from the surface 88 for the bearing 124) has a male member 161 with a rounded head 162 and a collar 164 thereabove. Extending from the web 134 is a hollow boss 166 whose lower wall 168 has a rounded recess or female member 170 to receive the male member 162 and form a universal joint. The upper end of the boss has an inwardly extending annular shoulder 172 and an opening 174 which is larger than the diameter of the male member 161 but less than that of the collar 164. Thus when the rollers bear against the various surfaces of the members 24 and 26 of the subframe 14, the shoulder 172 will disengage from the collar 164 and the rounded members 162 and 170 will engage to form an operative universal joint. This modification requires no chains or flexible suspension means for the bearing members. The side members 148 will still be used to limit the side movement of the bearing members to keep the rollers properly oriented on the surfaces of the subframe 14 and thereby minimize drag or scuffing.

Figure 5:
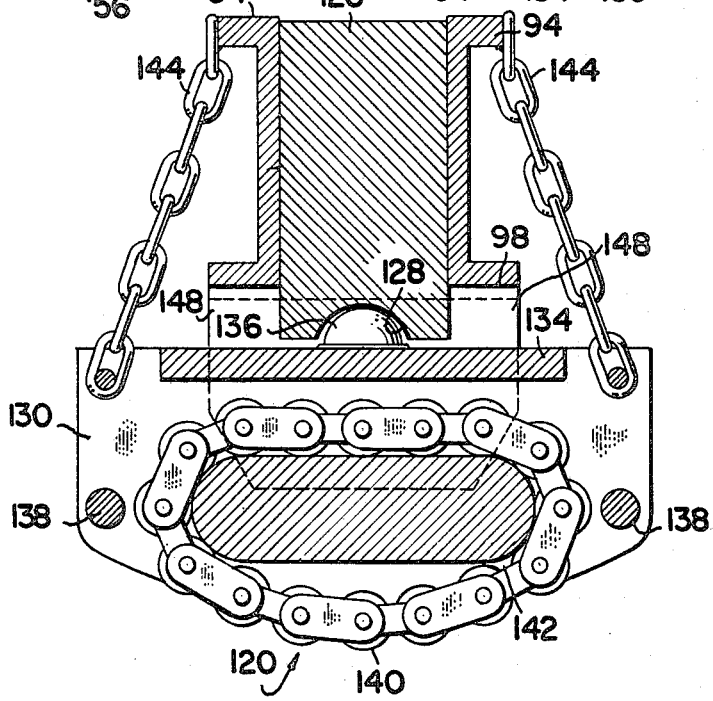
FIG. 5 is an enlarged longitudinal sectional view through a typical bearing member and taken on the line 5—5 of FIG. 3.
Figure 7:
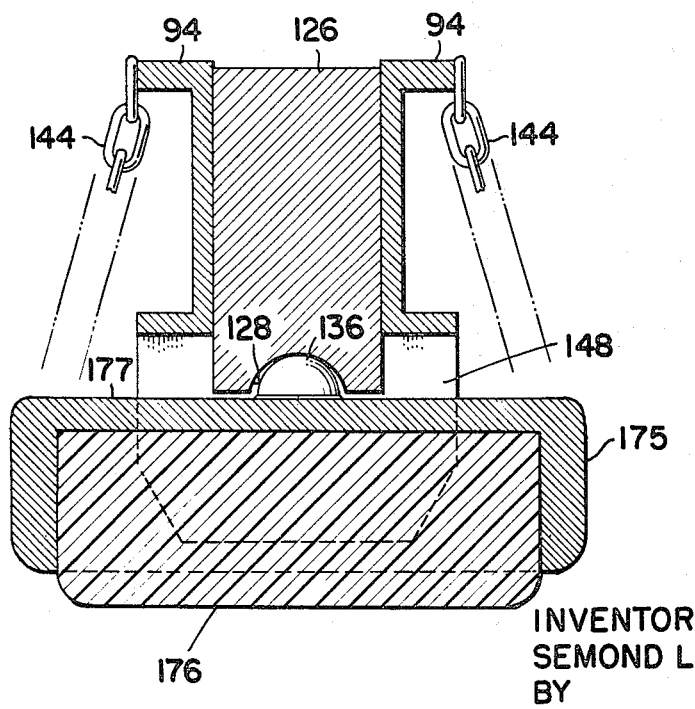
FIG. 7 is a view similar to FIG. 5 of yet another form of the bearing member.

The form of bearing member shown in FIG. 7 is identical with that shown in FIGS. 3–5 except that the roller bearing unit is replaced with an antifriction unit in the form of a graphitic Teflon or nylon block 176 or a block with an antifriction coating to bear against the various surfaces of the members 24 and 26 of the lift truck subframe 14. The block is retained in a bottom opening channel housing 175 by suitable counter sunk bolts or bonding.

the upper wall 177 of the housing carrying the upstanding spherical male member 136 of the universal connection.

Figure 2:
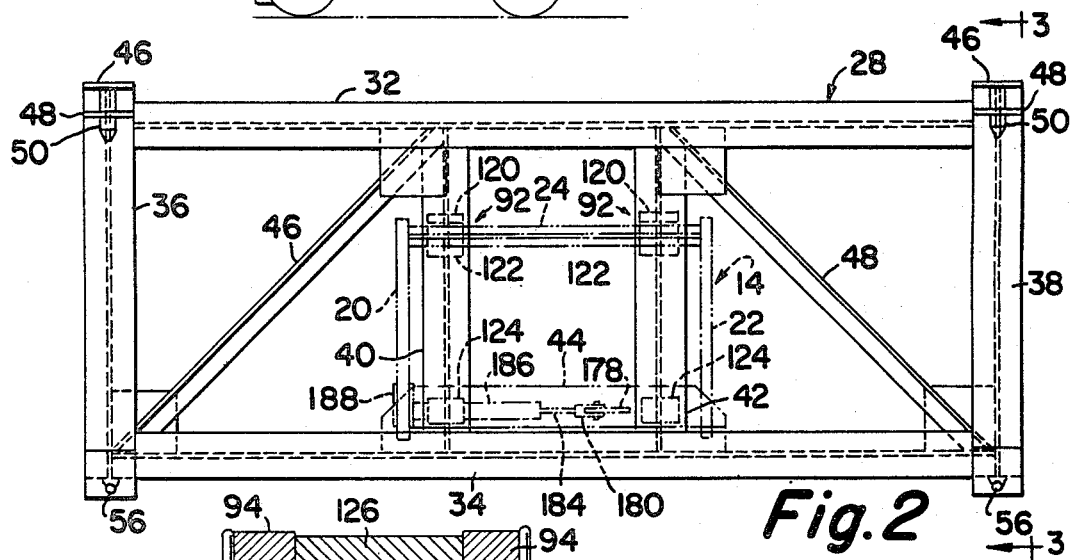
FIG. 2 is a front elevational view of the lifting frame, the lift truck subframe upon which it is mounted being shown in phantom.

The motive force to effect lateral movement of the lifting frame 28 relative to the subframe 14 (and hence the lift truck mounting it) is shown in FIGS. 2 and 4. It comprises a rearwardly extending bar 178 carried by the horizontal member 44 of the frame 28, a clevis 180 pivoted around a vertical pin 182 which extends through the bar 178, a piston rod 184 extending horizontally from and secured to the clevis, a double acting hydraulic cylinder 186 in which the piston operates and a means 188 carried by the cylinder and clamping the same to the vertical side member 20 of the subframe 14 as at 190. The cylinder 186 is operatively connected by suitable hoses 192 to a hydraulic system on the truck (not shown) which is manually operable as at 194 in the cab by a two-way, four-port or equivalent valve.

In use, the lifting frame 28 is mounted on the lift truck subframe 14 by hooking the members 92 over the upper horizontal member 24 of the subframe. In so doing the rollers of the upper bearing member 120 engage the upper surface 146 of the subframe member 24, the rollers of the upper side bearing member 122 engage the rear vertical surface 156 of the subframe member 24 and the rollers of the lower bearing member 124 engage the vertical front face 160 of the lower horizontal subframe member 26. The arms 104 are then brought up under the member 24 and secured in place by the rod 110 and cotter pin 114. If the relative positions of the lifting frame 28 and the subframe 14 are askew for some reason, the universal mounting of the bearing members will be accommodated and the side plates 148 associated with each bearing member will limit the pivotal movement of the bearing member so that the rollers will be properly oriented on the bearing surfaces 146, 156 and 160 of the subframe.

The means 18 is then operated to tilt the upper end of the boom 12 away from the lift truck 10 until the upper vertical pins 50 are aligned with the openings 80 in the upper corner members 76. In most instances, the operator can effect the alignment quite readily. However, if he cannot, then he operates valve 194 in the cab to shift the frame 28 laterally relative to the lift truck subframe. Shifting in opposite directions can be effected by simply reversing the valve 194. The frame 28 is then lowered until the upper vertical pins extend into the upper corner members. The boom 12 is then tilted back while the truck is moved forward the container, in which operation the lower horizontal pins 56 enter the lower corner members 82 and the action is continued until the container bears against the frame 28. By operation of the means 16, the container is then raised and carried in such condition by the lift truck to a desired location, as seen in FIG. 1. If the load in the container is unbalanced, it may become desirable to align the center of gravity of the laden container with the center of effort of the lift truck, in which case the means 194 is again operated to shift the frame 28 relative to the subframe 14. In the final position, an edge of the vertical wall 84 of the lower corner member 82 engages behind the shoulder 62 of the horizontal pin 56 to prevent accidental retraction of the pin. If the container is to be stacked on a lower container, it is lowered thereon, the boom 12 is again tilted forwardly until the lower pins 56 are retracted horizontally from the lower corner members, the frame 28 is raised until the upper pins 50 are retracted vertically from the upper corner members, and the truck backed away for reuse elsewhere.

It should be noted that the top vertical pins 50 take horizontal shear while the bottom horizontal pins 56 take the vertical load. The frame 28 is such that the portion bounded by the lower horizontal member 34, the diagonal braces 46 and 48, that portion of the upper horizontal member 32 between the upper ends of the diagonal braces, and the intermediate vertical members 40 and 42 constitute a prime truss; and the top member 32 acts as a beam-tie (tension) while the bottom member 34 which is heavier acts as a beam column. While the bearing members 120, 122 and 124 are shown mounted on the frame 28 for universal pivotal movement, they primarily require pivotal movement around two horizontal axes, one lengthwise of the frame, and the other fore and aft.

While preferred embodiments of the invention have been shown and described, it will be understood that skilled artisans can make variations without departing from the invention as defined in the appended claims.

I claim:

1. In combination with a substantially rectangular container having upper corner members with horizontal walls and openings therethrough and lower corner members with vertical walls and openings therethrough, and a lift truck including a vertical boom and a subframe mounted thereon for movement vertically along said boom; means to lift said container comprising a frame substantially coextensive with said container, horizontal pins extending from the front of said frame adjacent its lower corners and adapted to enter said lower container corner members via their openings, vertical pins extending downwardly from said frame at its front adjacent its upper corners and adapted to enter said upper container corner members via their openings, means at the rear of said frame slidably mounting said frame on said subframe including bearing members pivotally mounted between opposed portions of said frame and said subframe, and power means to effect sliding movement of said frame relative to said subframe.

2. The combination of claim 1 wherein said subframe includes an upper horizontal member having a top surface and a rear side surface and a lower horizontal member having a front side surface, said means slidably mounting said frame on said subframe including rearwardly extending hollow members through which said upper horizontal member of said subframe extends, said bearing members including one mounted in each hollow member engaging said top surface of said upper horizontal member to take the traveling load, a second mounted in each hollow member engaging said rear side surface of said upper horizontal member, and a third mounted on said frame member engaging said front side surface of said lower horizontal member, said second and third bearing members taking the moment load.

3. The combination of claim 2 wherein each bearing member includes a roller assembly and means mounting the same on said frame for pivotal movement at least around longitudinal and fore and aft horizontal axes.

4. The combination of claim 2 wherein each bearing member is on an antifriction unit mounted on said frame for universal pivotal movement relative thereto.

5. The combination of claim 1 wherein said power means to effect sliding movement of said frame relative to said subframe includes a reversible hydraulic motor terminally connected to said frame and said subframe and valve means connected to said motor and operable from said lift truck.

6. A lifting member for a substantially rectangular container having upper corner members with horizontal walls and openings therethrough and lower corner members with vertical walls and openings therethrough comprised of a trussed frame substantially coextensive with the container, horizontal pins adjacent the lower corners of said frame at one side thereof adapted to enter the lower container corner members via their openings, vertical pins adjacent the upper corners of said frame at said one side thereof adapted to enter the upper container corner members via their openings, hook members extending from the other side of said frame adapted to engage the upper horizontal bar of the frame of a lift truck, upper and side bearing members pivotally mounted in each hook member disposed at right angles to each other and adapted to engage the top and one side surface respectively of the horizontal bar, and a further bearing member pivotally mounted on said frame beneath each hook member and adapted to engage an opposite side of a lower horizontal bar of the lift truck.

7. The combination of claim 6 wherein each bearing member includes a roller assembly and means mounting the same on said frame for pivotal movement at least around longitudinal and fore and aft horizontal axes.

8. In combination, a substantially rectangular container having corner members, a lift truck including a boom and a subframe mounted thereon for movement vertically therealong, said subframe including upper and lower horizontal members, a frame substantially coextensive with said container having pins adjacent its corners on the front side thereof adapted to enter said container corner members, hollow members extending from the rear side of said frame and receiving said upper horizontal member of said subframe, upper and side bearings pivotally mounted in each hollow member, said upper bearing engaging the top surface of said upper horizontal member and said side bearing engaging the rear side surface of the said upper horizontal member, and a third bearing pivoted to said frame beneath each hollow member and engaging the front side surface of said lower horizontal member, said frame being adapted for movement relative to said subframe in which said upper bearing takes the traveling load and the other two bearings take the moment load.

References Cited

UNITED STATES PATENTS

| | | | |
|---|---|---|---|
| 2,608,315 | 8/1952 | Turner | 214—731 |
| 2,827,184 | 3/1958 | Mueller | 214—654 X |
| 2,828,880 | 4/1958 | Perry | 214—730 |
| 3,015,407 | 1/1962 | Fesmire et al. | 294—67 X |
| 3,094,226 | 6/1963 | Gutridge et al. | 214—654 X |
| 3,289,873 | 12/1966 | Hansen | 214—730 |

GERALD M. FORLENZA, *Primary Examiner.*

R. BALLANTYNE, *Assistant Examiner.*